March 28, 1967 J. E. WARD 3,310,989
ACTUATOR AND TIMER
Filed July 9, 1965 4 Sheets-Sheet 1

INVENTOR.
JAMES E. WARD

March 28, 1967  J. E. WARD  3,310,989
ACTUATOR AND TIMER

Filed July 9, 1965  4 Sheets-Sheet 3

INVENTOR.
JAMES E. WARD
BY Christie, Parker & Hale
ATTORNEYS.

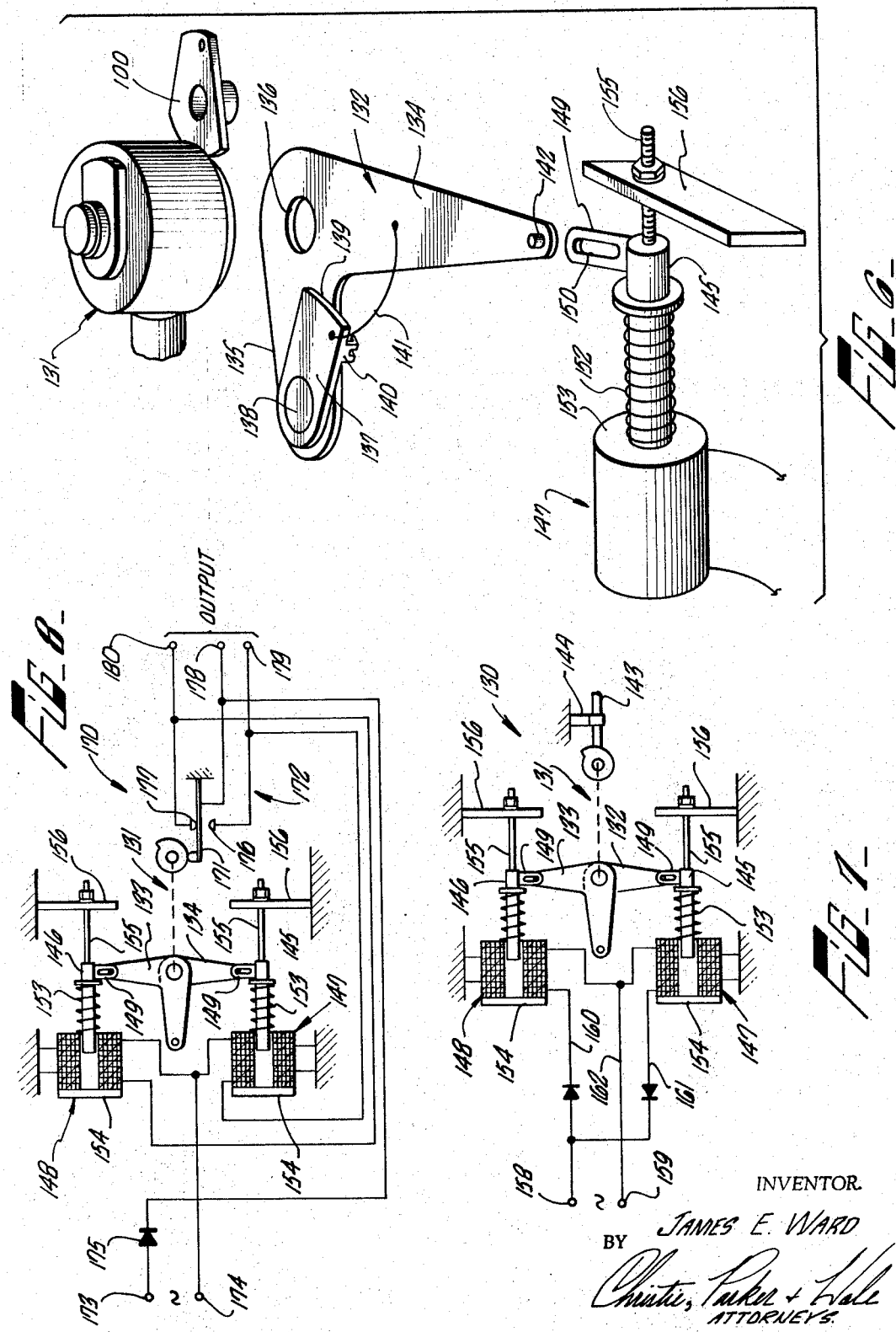

United States Patent Office 3,310,989
Patented Mar. 28, 1967

3,310,989
ACTUATOR AND TIMER
James E. Ward, Glendora, Calif., assignor to Relton Corporation, Pasadena, Calif., a corporation of California
Filed July 9, 1965, Ser. No. 473,565
31 Claims. (Cl. 74—117)

This invention relates to an actuator and timer apparatus and, more particularly, to such apparatus having a rotatable output shaft the rotational velocity of which is continuously variable between a maximum and a minimum, preferably equal to zero.

This application is a continuation-in-part of my copending application Ser. No. 327,348 filed December 2, 1963, now abandoned for Actuator and Timer.

Modern food merchandising techniques, such as are used in supermarkets, for example, employ substances having odors approximating the odors of various food products, the sales of which are to be stimulated. For example, assume it is desired that those present in the supermarket be given a subtle suggestion to purchase bacon. A container, containing under pressure a gaseous or volatile liquid substance which has an odor like that of bacon, is placed in proximity to the area of the store where bacon is displayed. Periodically a discharge nozzle on the container is operated to dispense a predetermined amount of the substance into the atmosphere. Shoppers present in the store then smell this substance and, hopefully, thereby receive a subtle suggestion that it would be desirable to purchase bacon. Pressurized containers of other substances having odors approximating the odors of other food products may be located at other areas of the store.

It has been found that each substance is most effective when dispensed according to a program which is peculiar to that particular substance. For example, a substance simulating the odor of bacon may be dispensed most beneficially from its container for a 10-second period, such periods occuring every 2½ minutes. The substance simulating the odor of oranges, on the other hand, may be dispensed most beneficially for 5 seconds at intervals of 5 minutes.

Where such marketing techniques are used, it is common that several essences be used simultaneously at different locations in the store. It is preferred that the essences be dispensed automatically by a compact apparatus which may be hidden from public view. Moreover, it is desirable, because of economic considerations, that the mechanisms used for automatically dispensing many different essences be identical. It is therefore desirable that the output characteristics of such mechanisms be variable so that a given mechanism may be adjusted to accord with the optimum dispensing program of a particular essence.

The present invention provides mechanical apparatus which has utility in operating the dispensing units of pressurized containers in situations like that described above, although the device may be used with facility in a multitude of applications. The apparatus is essentially an actuator and timer mechanism having an output cam, the circumference of which defines an output lobe and an idle time portion. The output characteristics of the mechanism are adjustable so that the duration of the period during which a cam follower is operated is adjustable over a wide range. Moreover, the duration of the interval between successive periods of cam follower operation is adjustable over a wide range.

The apparatus of the present invention also provides a novel and compact transmission mechanism wherein the rotation of an input shaft is transmitted to a rotatable output shaft. The transmission is characterized by the feature that the ratio of input shaft rotation to output shaft rotation is continuously variable between the preferred ratios of 4:1 and infinity. Two such transmission mechanisms are used in the actuator. One transmission is relied upon to drive the output cam of the actuator when the cam follower engages the active or lobed portion of the cam, and the other transmission is used to rotate the cam when the cam follower engages the inactive or idle time portion of the cam.

Generally speaking, this invention provides an actuator mechanism which includes a rotatable output shaft. First and second ratchet means are connected to the output shaft and each ratchet means is operable to index the output shaft angularly when a reciprocatory input is applied to it along a predetermined line. A pair of members each have one of its ends coupled to a respective one of the ratchet means. Constant displacement means are coupled to the other ends of the members and are operable for reciprocating the link members along the predetermined lines. The actuator mechanism also includes selectively operable means operatively coupled to each link member. The selectively operable means are operable for varying, independently of the other link member, the stroke of each link member reciprocably along the predetermined line associated with it.

Preferably each ratchet means controls rotation of the output shaft through a portion of each rotation thereof; the other ratchet means controls motion of the output shaft through the remainder of each rotation. Thus, there are two phases for each rotation of the output shaft. The duration of each phase is variable independently of the other by operation of the selectively operable means.

The present invention also provides a novel transmission mechanism for variably transmitting rotary motion from a rotatable input shaft to a rotatable output shaft; a pair of such transmissions are included in one form of the actuator mechanism described generally above. In each transmission, the end of a link member which is opposite from the ratchet means to which it is connected is connected by a connecting means to a crank means operated by the input shaft. The crank means has a constant throw. The connecting means includes means for constraining movement of the adjacent end of the link member to reciprocal movement along a straight line. The connecting means also includes means which are selectively operable to vary the orientation of the straight line angularly relative to a second line passing through the ends of the link member so that the amount of reciprocation of the link member for each rotation of the input shaft is variable. The line passing through the ends of the link member corresponds to the predetermined line associated with the ratchet means to which the link member is connected. As a results of the variability of the stroke of the link member, the amount the output shaft is indexed for each rotation of the input shaft is also variable.

The above-mentioned and other features of the present invention are more fully set forth in the following description of the invention presented in combination with the accompanying drawings, wherein:

FIG. 6 is an exploded view of a portion of another and presently preferred actuator and timer mechanism according to the present invention;

FIG. 7 is a semi-schematic view of the mechanism shown in part in FIG. 6; and

FIG. 8 is a semi-schematic view of a modification of the mechanism shown in FIG. 7.

Figure 1:
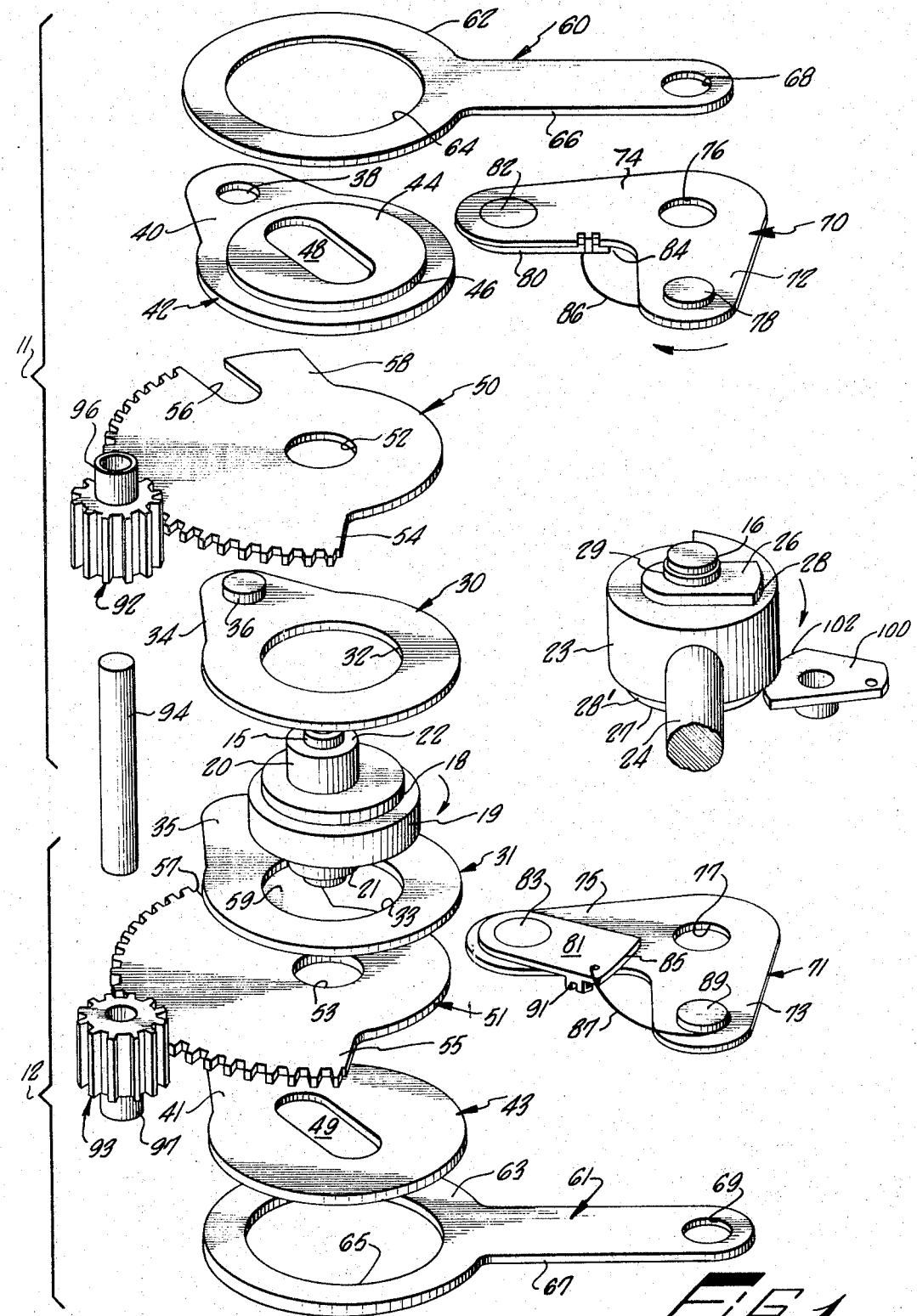
FIG. 1 is an exploded view of the drive mechanism of an actuator and timer mechanism according to the present invention.
Figure 2:
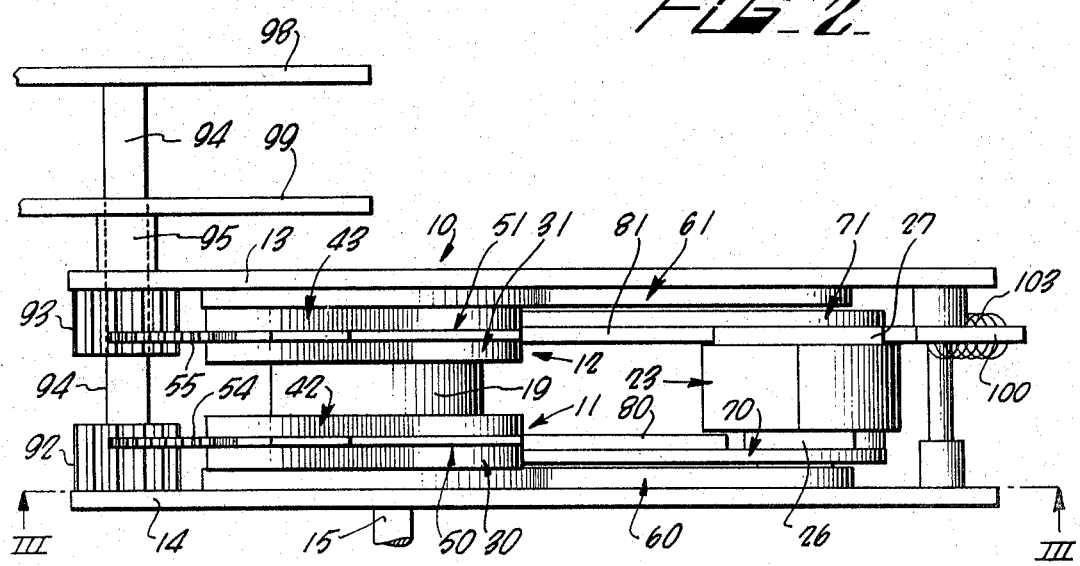
FIG. 2 is a top plan view of an actuator incorporating the drive mechanism shown in FIG. 1.
Figure 3:
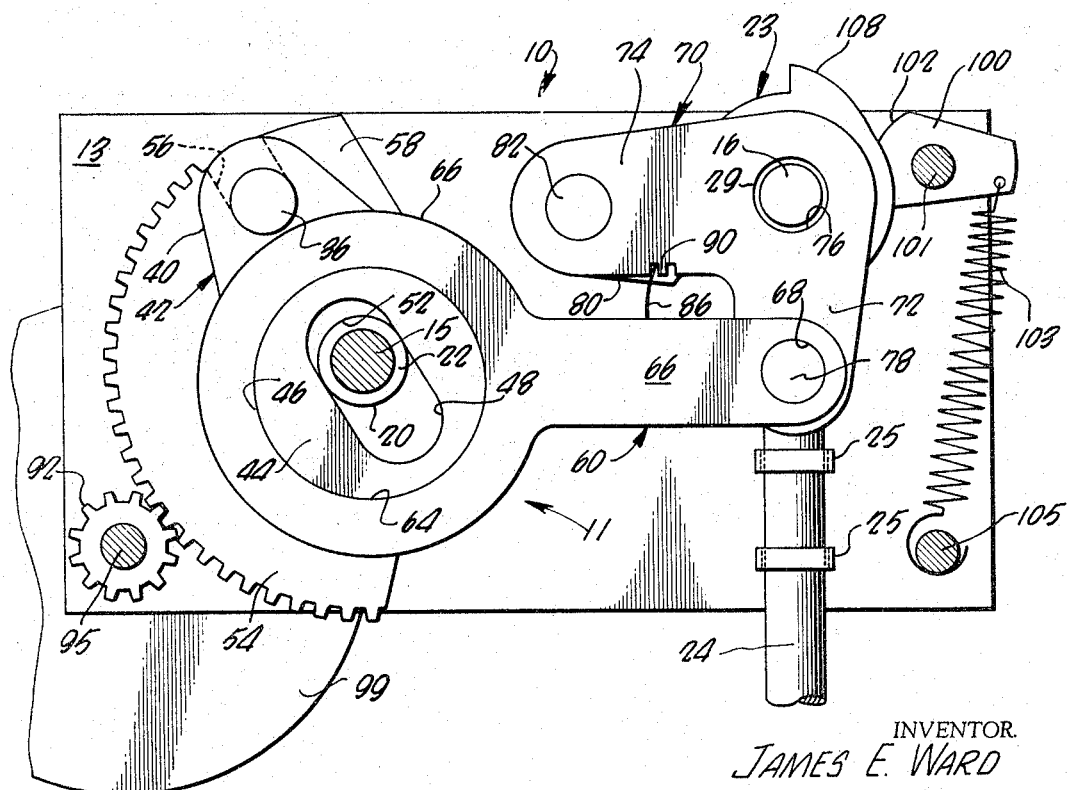
FIG. 3 is a cross-sectional elevation view taken along line III—III of FIG. 2.

Referring initially to FIGS. 1, 2, and 3, a variable output actuator and timer mechanism 10 is shown. The actuator mechanism includes two motion transmission mechanisms 11 and 12 mounted between a pair of support plates 13 and 14 which rotatably mount an input shaft 15 and an output shaft 16 in parallel spaced-apart relation to one another. The input shaft 15 extends through support plate 14 (as shown in FIG. 2) and is adapted for connection to an electric motor (not shown) either directly or by means of a gearbox (not shown), for example.

FIG. 1 shows only that portion of input shaft 15 which is disposed between support plates 13 and 14, the remainder of the shaft being omitted from FIG. 1 for the purpose of clarity of illustration. Between the support plates, the input shaft defines a pair of circular eccentric crank wheels, only one of which, characterized by numeral 18, is visible. The eccentric wheels need not be in phase with one another, but in the preferred form of the invention illustrated the eccentric wheels are disposed in phase with one another angularly of shaft 15. The eccentric wheels are spaced apart from one another axially of the input shaft by a spacer wheel 19 which is also eccentric to the shaft and is of greater diameter than the eccentric wheels. Opposite each eccentric wheel from the spacer wheel, the shaft carries a concentric bearing portion 20 and 21. The bearing portions define oppositely opening shoulders 22 which loosely abut the opposing surfaces of support plates 13 and 14 to position the input shaft between the support plates.

Output shaft 16 carries an output cam 23, the outer circumference of which defines the program for actuation of a cam follower 24 which is reciprocally mounted in a pair of guide brackets 25 extending between the support plates 13 and 14. Adjacent opposite ends of the cam, the output shaft carries a pair of ratchet engaging members 26 and 27, each of which has a circular surface 28 extending for a predetermined distance circumferentially of the output shaft. In the embodiment of the invention illustrated in FIG. 1, the circumferential surface 28' of member 27 extends for 360° around output shaft 16, while the corresponding surface of member 26 extends only for about 50° circumferentially of the output shaft. The distance radially of the output shaft to surfaces 28 and 28' is equal for members 26 and 27. Adjacent members 26 and 27, the output shaft carries a pair of circular spacer discs 29 which define shoulders opening in opposite directions of the output shaft. The shoulders engage the opposing surfaces of support plates 13 and 14 to position the output shaft between the support plates. The output shaft is rotatably mounted in circular apertures (not shown) formed at axially aligned locations in the support plates.

The components of transmission mechanisms 11 and 12 are essentially identical and therefore only the components of transmission mechanism 11 will be described in detail in conjunction with FIG. 1. In such description, even numbers are used to designate the structure features of the mechanism. The number next succeeding an even number between 30 and 98 will be understood to refer to the corresponding structural feature of transmission mechanism 12.

Eccentric wheel 18 is coupled to a crank plate 30 by being engaged about its circumference by the crank plate. To this end, crank plate 30 defines a circular aperture 32 of diameter corresponding to the diameter of eccentric wheel 18, the eccentric wheel being disposed in the crank plate aperture. The crank plate also defines a laterally extending arm 34 which carries a wrist pin 36 at a location spaced from the center of aperture 32. The wrist pin extends away from the crank plate parallel to the axis of input shaft 15. As input shaft 15 is rotated, crank plate 30 gyrates about the axis of the input shaft because of the eccentric mounting of wheel 18 relative to the axis of the input shaft.

Wrist pin 36 is pivotally engaged in an aperture 38 formed through a laterally extending arm 40 of a connector plate 42. The connector plate, at a location spaced from aperture 32, defines a circular boss 44 raised from the plane of the connector plate and having a circumferential cylindrical surface 46 disposed parallel to the axis of the input shaft. An elongated slot 48 is formed through the connector plate centrally of boss 44. The slot has a width slightly greater than the diameter of bearing portion 20 of input shaft 15 and has a length at least equal to the sum of (1) the diameter of input shaft bearing portion 20, and (2) the eccentricity of crank wheel 18 relative to the axis of the input shaft. Aperture 38 is aligned with slot 48, although a slight deviation in the alignment of aperture 38 with the slot may be tolerated. The connector plate is disposed in the transmission mechanism so that bearing portion 20 of the input shaft is engaged in slot 48.

A wrist pin stroke director plate 50 is mounted to input shaft bearing portion 20 between crank plate 30 and connector plate 42 by journalling the input shaft bearing portion in a circular aperture 52 formed through the director plate. The director plate also defines a segment 54 of a circular gear, the teeth of the gear segment being arranged concentric to the axis of aperture 52. A slot 56 is formed radially of aperture 52 in the director plate. As shown, the slot is defined by one end of gear segment 54 and the adjacent edge of an outwardly extending tab 58 disposed in the plane of the director plate radially of aperture 52. The distance between the gear segment and the adjacent edge of tab 58 is slightly greater than the diameter of crank wrist pin 36. As illustrated in FIG. 3, the director plate is mounted so that the wrist pin is engaged in director plate slot 56.

Bearing portion 20 of input shaft 15 preferably has a length axially of the input shaft equal to the total of the thicknesses of the director plate and the connector plate through the boss portion thereof.

As input shaft 15 rotates, the crank plate is gyrated about the axis of the input shaft because of the eccentric connection of the crank plate to the shaft. The engagement of wrist pin 36 in director plate slot 56, however, constrains movement of the wrist pin so that the wrist pin moves reciprocally along a straight line oriented radially of the axis of input shaft 15 and defined by slot 56. This reciprocatory movement of the wrist pin is imparted to connector plate 48 and the connector plate is guided in reciprocal motion by engagement of input shaft bearing portion 20 in slot 48 of the director plate.

The crank plate, the connector plate, and the director plate comprise means for pivotally connecting a member to crank wheel 18, the member being pivotally engaged with the connector plate by journalling boss 44. This connecting means is seen to include means for constraining movement of the portion of the member which journals the boss to reciprocal movement along a straight line. Since the director plate journals the input shaft, it is movable angularly of the input shaft. The connecting means, therefore, is seen to include means which are selectively operable (by reason of gear segment 54) to vary the line of reciprocal movement of the member.

A rigid connecting drive link 60, having an annular disc portion 62 at one end thereof, is pivotally engaged with the connector plate by journalling connector plate boss 44 in a central circular aperture 64 of link portion 62. An elongated arm 66 extends away from the link disc portion as shown in FIG. 1. A circular aperture 68 is formed through the arm at a location spaced apart from aperture 64.

A bellcrank-like ratchet lever 70 is engaged between the end of link arm 66 and output shaft 16. Ratchet lever 70 defines a pair of arms 72 and 74 which extend radially from an aperture 76 formed through the ratchet lever at the junction of the arms. In the embodiment of this invention illustrated in FIGS. 1, 2, and 3, arms 72 and 74 are disposed at substantially right angles to one another. A pivot pin 78 is connected to arm 72 at a location spaced from aperture 76 and this pin is engaged in link aperture 68 to pivotally connect the ratchet lever arm and connecting link 60. The ratchet lever is also pivotally connected to the output shaft by engaging a corresponding output shaft spacer disc 29 in aperture 76 of the lever. With the ratchet lever so coupled between the connecting link and the output shaft, lever arm 74 extends radially of the output shaft generally toward input shaft 15 (as shown in FIG. 3).

Ratchet lever 70 is a component of a ratchet assembly which is connected to the output shaft and is operable to index the output shaft angularly in response to a reciprocatory input to the ratchet assembly. The reciprocatory input to the ratchet assembly is derived from movement of the connecting link, which movement may be substantially wholly reciprocatory, or substantially wholly pivotal about pivot pin 78, or a combination of pivotal and reciprocal movements. The reciprocal portion of movement of the connecting link is relied upon to operate the ratchet assembly since such movement of the link is transferred to the ratchet lever 70 at pivot pin 78.

In order to accomplish indexing of the output shaft in response to reciprocatory movement of connecting pin 78, a ratchet pawl lever 80 is movably connected to the end of arm 74 by a pivot pin 82. The pawl lever defines a curved surface 84 (see surface 85 of transmission mechanism 12) adjacent aperture 76, which surface is engageable with surface 28 of ratchet engageable member 26 carried by the output shaft. The pawl lever is biased into alignment with ratchet lever arm 74 by means of a spring 86 engaged between the pawl lever and a lug (see lug 89 on ratchet lever 71) disposed on arm 72. The ratchet pawl lever also carries a stop finger 90 so that, in combination with spring 86, the pawl is maintained in position for engaging surface 28 of ratchet engageable member 26.

It was noted above that link 60 may experience motion which is substantially entirely reciprocal, or which is substantially entirely pivotal about aperture 68, or which is a combination of these two movements. The nature of the movement experienced by connecting link 60 in response to rotation of input shaft 15 is determined by the angular relation between the elongate extent of slot 48 of connector plate 42 and an imaginary reference line passing through the centers of connecting link apertures 64 and 68. As noted above, this angular relation is controlled by the position of wrist pin stroke director plate 50 angularly of input shaft 15. When slot 48 is aligned normal to the imaginary reference line, the movement of the connecting link is substantially entirely pivotal about connecting pin 78 of the ratchet assembly and no reciprocatory input is experienced by the ratchet assembly; the result is that output shaft 16 is not indexed angularly by transmission means 11 in response to rotation of input shaft 15. On the other hand, when slot 48 is aligned parallel with the imaginary reference line, the movement experienced by the connecting link is substantially entirely reciprocal and the output shaft is indexed angularly by operation of transmission means 11 in response to the rotation of the input shaft. Any alignment of slot 48 between these two extremes imparts both pivotal and reciprocatory motion to the connecting link.

It is apparent from an examination of FIG. 1 that the amount of reciprocatory motion experienced by connecting link 60 is equal to the stroke of wrist pin 36 times the cosine of the angle between the line of reciprocation of the wrist pin and the imaginary reference line associated with the connecting link. It therefore follows that the ratio of the angular velocity of the input shaft to the angular velocity of the output shaft is harmonically variable between a minimum and a maximum (infinity) at which the output shaft experiences no movement.

Because the cranks have a constant throw and because the line along which the crank throws are effective may be aligned with the elongate extents of the connecting links, it is apparent that the above-described structure comprises constant displacement means connected and coupled to the connecting links for reciprocating the connecting links along lines which correspond to the lines along which act reciprocatory inputs to the ratchets. The director plates and gears 92 and 93 comprise selectively operable means operatively coupled to the connecting links for varying independently the stroke of the connecting links along lines of reciprocatory input to the ratchets.

The minimum speed reduction ratio available in a transmission according to this invention may be on the order of 3:1 as where ratchet lever 70 moves through an arc of 120° about shaft 16 for each reciprocation of connecting link 60; preferably, however, the ratchet lever moves through an arc of 90° for the maximum reciprocation of the connecting link so that the preferred minimum speed reduction is 4:1.

The speed reduction ratio from the input to the output shaft in any given application of the apparatus of this invention is controlled by the position of director plate 50 angularly of the input shaft. In order that such control may be obtained, a pinion gear 92 is engaged with gear segment 54 of the director plate. Pinion gear 92 is connected to a rotatable shaft 94; gear 92 also has a shank 96 which is journalled in a cooperating aperture in support plate 14. Shaft 94 is coaxial with an integral stub shaft 95 of gear 93 which is journalled in support plate 13. A pair of operating wheels 98, 99 are connected to each of shafts 94, 95, respectively, so that the pinions 92 and 93, and the director plates associated therewith, may be indexed independently of one another. This construction provides that the speed reduction ratios of transmission mechanisms 11 and 12 may be varied independently of one another.

It was noted that ratchet engageable portion 26 of output cam 23, which cam is common to both transmission mechanisms 11 and 12, has its circumferential surface 28 extending only partially about the axis of output shaft 16. Ratchet engageable portion 27, on the other hand, has its circumferential surface 28 extending completely peripherally of the output shaft. Accordingly, transmission mechanism 12 is continually engaged with the output shaft, but transmission mechanism 11 is engaged with the output shaft only when surface 84 of pawl lever 80 is engaged with the circumferential surface of ratchet engageable member 26. In view of such a construction, it is preferred that director plate 50 be positioned about input shaft 15 so that the speed reduction ratio from the input to the output shaft through transmission mechanism 11 is less than the speed reduction ratio of transmission mechanism 12. Accordingly, rotation of the output shaft is controlled primarily by the setting of transmission mechanism 12, but the low output thereof is overridden by the higher speed output of transmission mechanism 11 when ratchet engageable member 26 is engaged by pawl member 80. If operating wheel 98 were adjusted so that the reciprocation of connecting link 60 were less than the reciprocation of connecting link 61, then the setting of transmission mechanism 12 would be controlling in all cases.

In order to assure proper operation of the ratchet assemblies of the transmission mechanisms present in actuator 10, a ratchet drag brake is continuously engaged with the output shaft, the effect of the engagement of the drag brake with the output shaft being overridden by the ratchet assemblies. In the embodiment of the invention shown in the drawings, the drag brake is provided by a drag lever 100 which is pivotally mounted on a support shaft 101 which extends between support plates 13 and 14 adjacent the output shaft. The drag lever has a curved surface 102 adjacent the output shaft which is biased into continual engagement with the circumferential surface of ratchet engageable member 27 by a spring 103 engaged between the drag lever and a spacer rod 105 connected between the support plates.

The cylindrical exterior surface of output cam 23 defines a cam lobe 108 having a predetermined rise characteristic and a predetermined fall characteristic. Lobe 108 preferably is the active portion of the output cam, the remainder of the circumference of the cam being the idle time portion of the cam. In the embodiment of the invention illustrated, lobe 108 extends circumferentially of the cam over an arc which is preferably equal to the arc surface 28 of ratchet engaging portion 26 subtends relative to the axis of the output shaft.

Cam follower 24 is biased (by means not shown) into engagement with the cylindrical circumferential surface of the output cam. When the cam follower is engaged with the idle time portion of the cam, rotation of output shaft 16 is controlled by the setting of transmission mechanism 12 since ratchet pawl 80 is not then engaged with ratchet engageable portion 26. In order to assure that this is the case, the phase of ratchet engaging member 26 relative to lobe 108 is predetermined; ideally, the lobe and ratchet engaging portion 26 are 90° out of phase with one another relative to the output shaft, the lobe lagging its ratchet engageable member. As the cam is indexed by operation of transmission mechanism 12, ratchet engageable portion 26 is brought into engagement with pawl lever 80 so that the output of transmission mechanism 12 is overridden by the output of transmission mechanism 11, the latter defining a smaller speed reduction ratio between the input and output shafts than the former. As the output of transmission 12 is overridden by the output of transmission 11, cam follower 24 is engaged with lobe 108 such that the cam follower is reciprocated in its mounting brackets, such reciprocation being relied upon to operate some other mechanism such as the dispensing mechanism for a pressurized container of bacon essence. The amount of time that the cam follower is operated is dependent upon the period of time required for the lobe to pass out of engagement with the cam follower, such time being determined by the speed reduction setting of transmission 11 and the rotational velocity of output shaft 15. The period of time before the cam follower is again operated is determined by the setting of stroke director plate 51 and by the rotational velocity of input shaft 15.

From the foregoing description, it is apparent that the mechanism described above lends itself readily to use in conjunction with mechanisms which must be operated according to similar programs having different active and/or inactive periods. Because of the complete standardization of parts possible, such devices may be manufactured very economically. The only component of the apparatus which need be varied to adapt the apparatus to control programs not within the capability of the specific apparatus described is the output cam.

Figure 4:
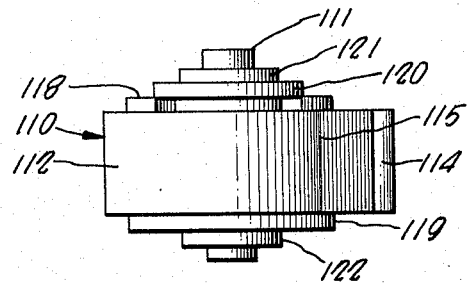
FIG. 4 is a top plan view of an alternate form of output cam having utility with the actuator of the present invention.
Figure 5:
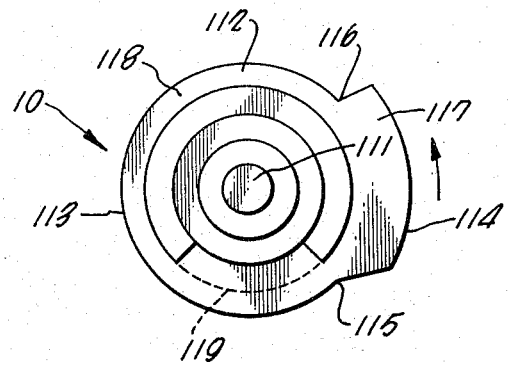
FIG. 5 is a side elevation view of the cam shown in FIG. 4.

FIGS. 4 and 5 illustrate an output cam 110 which may be used with the present apparatus where cam 23 is not preferred. Cam 23 has the characteristic that transmission mechanism 12 is continuously engaged with the cam such that transmission mechanism 11 must be set to define a higher output speed of the cam than the other transmission mechanism in order that the cam have two separate and distinct stages of rotational velocity for each rotation thereof. Cam 110 is shown integral with an output shaft 111. The cam has a cylindrical control surface 112 which is divided into an inactive or idle time portion 113 and an active or follower operating portion 114. The active portion of the cam control surface extends between a program beginning point 115 and a program end point 116 disposed at the extreme ends of a cam lobe 117 which extends for about 120° around the circumference of output shaft 101.

The output cam defines first and second ratchet engageable portions 118 and 119 disposed concentric to the axis of the output shaft on opposite sides of the cam. The ratchet engageable portions extend circumferentially about the output shaft over arcs corresponding to the arcs subtended by the inactive and active portions of cam control surface 112, respectively. Accordingly, ratchet engageable portion 118 subtends an arc of about 240° circumferentially of the output shaft while ratchet engageable portion 119 subtends an arc of about 120°. The ratchet engageable portions are disposed opposite from one another with respect to the output shaft so that there is no overlap between the ratchet engageable portions.

In the apparatus illustrated in FIGS. 1, 2, and 3, the cam follower 24 is disposed substantially at right angles to the mean position of the ratchet pawl levers, and output shaft 16 (shown in FIG. 3) rotates in a clockwise direction. Accordingly, ratchet engageable portion 119, disposed at the lower end of output shaft 111, as seen in FIG. 4, is shown in FIG. 5 as being disposed 90° out of phase with the cam lobe proceeding in a counterclockwise direction, i.e., lobe 117 lags ratchet engageable portions 119 by 90°. Transmission mechanism 12 cooperates with ratchet engageable portion 119.

Since there is no overlap betwen ratchet engageable portions 118 and 119 when the integral output shaft and can unit is disposed between support plates 13 and 14, it is apparent that either of transmission mechanisms 11, 12 may be set to define a higher output shaft rotational velocity than the other and that such setting will be reflected in the rotational velocity of the output shaft. In other words, it is not required that one transmission mechanism override the other in order that output shaft 111 experience two separate rotational velocities during each rotation thereof. Accordingly, it is apparent that use of an output cam and shaft combination like that shown in FIGS. 4 and 5, provides a more flexible outer program for actuator 10 than an apparatus in which the output cam and shaft unit is configured as shown in FIGS. 1, 2, and 3.

Adjacent ratchet engageable portion 119, output shaft 111 has a first enlarged diameter portion 120. The curved surface 102 of ratchet brake lever 100 is engageable with the circularly cylindrical circumferential surface of the first enlarged diameter portion 120. The output shaft defines second enlarged diameter portions 121 and 122 adjacent first enlarged diameter portion 120 and adjacent ratchet engageable portion 118, respectively. The second enlarged diameter portions are engageable in apertures 76 and 77, respectively, of the ratchet assemblies of transmission mechanisms 11 and 12, respectively. The stub shaft portions of output shaft 111 which extend outwardly from second enlarged diameter portions 121 and 122 are engageable in aligned apertures in the support plates to rotatably mount the output shaft.

The apparatus described above is to be distinguished from the variable speed power transmission disclosed in U.S. Patent No. 2,691,896, issued Oct. 19, 1954 to Sterling O. Stageberg. The patent discloses a device in which an eccentric crank is mounted to a rotatable input shaft. The crank is connected by means of a connecting link to a ratchet which is operably connected to a rotatable output shaft of the device. The patent discloses a plurality of such mechanisms, the eccentric cranks of which are spaced regularly about the circumference of the input shaft so that the output shaft has substantially constant rotational motion. The ratio of input shaft rotational velocity to output shaft rotational velocity is controlled by a plurality of control links which are ganged together such that motion of one control link operates all control links to alter the reciprocation of the connecting links in equal amounts.

In the apparatus described above, on the other hand, the amount which the connecting link of one transmission mechanism reciprocates for each rotation of the input shaft is variable independently of the amount the other connecting link reciprocates so that rotation of the output shaft is divided into two stages.

FIGS. 6 and 7 illustrate an electromechanical variable actuator and timer mechanism 130 which forms a presently preferred embodiment of this invention. The description of mechanism 130 is presented after the description of mechanism 10 so that its description may be simplified and so that the broad aspects of this invention may be more readily understood.

Mechanism 130 includes an output shaft and control cam unit 131 which, as shown in FIG. 6, is identical to output shaft 16 and cam 23 described above; accordingly, the output shaft and cam unit 131 will not be described at this point in detail. (In FIG. 7, the output cam is separated from ratchet levers 132 and 133 for the purposes of clarity of illustration, the integrality of the unit being represented by a dashed line.) It will be understood, however, that output cam 110 illustrated in FIGS. 4 and 5 may be used in mechanism 130 if desired.

Like mechanism 10, mechanism 130 includes a pair of ratchet mechanisms and drive means therefor, only one ratchet mechanism and its drive means being show in FIG. 6. Each of a pair of ratchet levers 132 and 133 are engaged with the output shaft. Ratchet lever 132 (ratchet lever 133 is similar and therefore is not described) has a pair of arms 134 and 135 which lie at substantially right angles to each other. An aperture 136, in which the output shaft is rotatably journalled, is formed through ratchet lever 132 adjacent the junction of the arms. A ratchet pawl lever 137 is pivotally connected to the end of ratchet lever arm 135 by a pin 138 and, adjacent aperture 136, has a curved end surface 139 which is engageable with the adjacent ratchet engageable member of the output shaft and cam unit. The ratchet pawl lever carries a stop finger 140, so that, in conjunction with a spring 141 connected between the pawl lever and arm 134, the pawl lever is maintained in position for engaging the output shaft and cam unit. A pin 142 is carried by the ratchet lever at the end of arm 134.

A drag brake lever 100 is engaged with output shaft and cam unit 131 as shown in FIG. 6. Also, a reciprocable cam follower member 143 is slidably mounted in a support 144 for engagement with the output cam.

Each of a pair of rigid link members 145 and 146 are engaged with ratchet levers 132 and 133, respectively, and are reciprocated along predetermined lines by cyclic operation of respective ones of a pair of solenoids 147 and 148. Each link member carries a lateral lug 149 at one end thereof. The lugs are slotted as at 150 to receive pins 142 so that reciprocation of the link members oscillates the ratchet levers angularly of the output shaft and causes the output shaft to be indexed angularly an amount corresponding to the stroke of whichever one of the link members is then engaged in driving relation to the output shaft.

The link members preferably are defined by the armatures of the solenoids. Each armature or link member carries a collar 151 adjacent lug 149. A compression spring 152 is engaged circumferentially of each armature between the collar and the adjacent end of the coil 153 of the solenoid so that the armatures normally are biased away from the solenoid coils, but are moved toward the coils when the coils are energized. A stop plate 154 is mounted to the end of each coil opposite from the spring so that movement of the armature in a direction which produces compression of the spring is limited. The armatures have normal positions away from the coils defined by springs 153. Thus, the solenoids and springs 153 comprise constant displacement means coupled to the link members for reciprocating the link members along lines which are the lines of reciprocatory input to the ratchet mechanisms.

An adjustment stop member 155 is threadably engaged in a fixed bracket 156 adjacent the free end of each link member so that the stop member is aligned with the link member and is adjustable in position toward and away from the solenoid coil associated with the link member. Each strip member is adapted for abutment against the adjacent end of the associated link member to limit the movement of the link member away from its solenoid coil. Thus, each stop member comprises selectively operable means operatively coupled to each link member for independently varying the stroke of its associated link member along a line of reciprocatory input to the ratchet mechanism to which the link member is connected.

As shown in FIG. 7, the solenoids 147 and 148 are coupled to energization terminals 158 and 159 by input conductor 160 and 161 respectively, and by a common return conductor 162. Each of a pair of half-wave rectifiers 163 and 164 are connected to solenoids 147 and 148, respectively, in such a manner that when an A.C. voltage is applied across terminals 158 and 159, the solenoids are energized alternately. In other words, solenoid 148 is energized by a positive voltage pulse and solenoid 147 is energized by a negative voltage pulse.

Mechanism 130 has the feature that the period during which cam follower 143 is engaged with the active portion of the output cam is variable independently of the period during which the follower is engaged with the idle-time portion of the cam.

FIG. 8 illustrates another actuator and timer mechanism 170 according to this invention. Mechanism 170 is similar to mechanism 130 except that cam follower 143 is replaced by a movable contact 171 of a switch 172 and the energization of solenoids 147 and 148 is controlled by the switch so that only that solenoid which, at any given time, is coupled to the output shaft is connected to a source of energizing potential. Mechanism 170 has a pair of input terminals 173 and 174 adapted to be connected to a source of single phase A.C. electric power. Terminal 173 is connected via a half-wave rectifier 175 to movable switch contact 171. The movable switch contact is engaged with the output cam of the mechanism. Depending on whether the contact is engaged with the active portion of the cam or the idle-time portion of the cam, it engages one or othe other of a pair of fixed switch contacts 176 and 177. The coil of solenoid 147 is coupled between contact 176 and input terminal 174 so that it is energized cyclically when switch contacts 171 and 176 are engaged. The coil of solenoid 148 is coupled between contact 177 and input terminal 174 so that it is energized cyclically when switch contacts 171 and 177 are engaged.

The mechanism also has output contacts 178, 179, and 180 provided by switch 172. Output contacts 178–180, respectively, are connected to switch contacts 171, 176, and 177. Any suitable electrical device, the ON-OFF operation of which is to be controlled, may be coupled across terminals 178 and 179 or 178 and 180 as desired, or two such devices may be controlled by the mechanism in such a manner that they operate alternately.

In view of the foregoing description of three embodiments of this invention, it will be seen that this invention provides a timer and actuator mechanism having a rotatable output shaft, each rotation of which is divided into two stages. The velocity of shaft rotation through each stage is variable independently of the velocity of shaft rotation for the other stage. Mechanism 10, the first described embodiment of the invention has the additional feature that it may be used as a speed reducing power transmission.

While the invention has been described above in conjunction with specific apparatus and particular applications thereof, this has been done merely by way of example rather than limitation and should not be regarded as limiting the scope of the invention.

What is claimed is:

1. An actuator mechanism comprising a rotatable output shaft, a plurality of ratchet means connected to the output shaft each operable to index the output shaft angularly in response to a substantially reciprocatory input thereto along a predetermined line and arranged for indexing the output shaft in a common direction, a corresponding plurality of link members each connected at one end thereof to a respective ratchet means, constant displacement means coupled to the other ends of the link members operable for reciprocating the link members along said predetermined lines, and selectively operable means operatively coupled to each link member for varying independently of the other link members the stroke of each link member reciprocably along the predetermined line associated therewith.

2. An actuator mechanism comprising a rotatable output shaft a plurality of ratchet means connected to the output shaft each operable to index the output shaft angularly in response to a substantially reciprocatory input thereto along a predetermined line and arranged for indexing the output shaft in a common direction, a corresponding plurality of link members each connected at one end thereof to a respective ratchet means, cyclically operable means coupled to the other ends of the link members operable for reciprocating the link members a predetermined distance along the predetermined lines associated with the ratchet means to which the respective link members are connected, and selectively operable means operatively coupled to each link member for limiting the amount each link member moves reciprocably along the predetermined line associated therewith for each operation of the cyclically operable means to an amount, a selected amount less than the predetermined distance, each selectively operable means being operable independently of the other selectively operable means.

3. An actuator mechanism comprising a rotatable output shaft, a plurality of ratchet means connected to the output shaft each operable to index the output shaft angularly in response to a substantially reciprocably input thereto along a predetermined line and arranged for indexing the output shaft in a common direction, each ratchet means being connected to the output shaft so that it is effective upon operation thereof to rotate the shaft through a different selected portion of each rotation thereof, a corresponding plurality of link members each connected at one end thereof to a respective ratchet means, cyclically operable means coupled to the other ends of the link members operable for reciprocating the link members a predetermined distance along the predetermined lines associated with the ratchet means to which the respective link members are connected, and selectively operable means operatively coupled to each link member for limiting the amount each link member moves reciprocably along the predetermined line associated therewith for each operation of the cyclically operable means to an amount, a selected amount less than the predetermined distance for the link member, each selectively operable means being operable independently of the other selectively operable means whereby the rotational velocity of the output shaft through each portion of a rotation thereof is independently variable.

4. An actuator mechanism comprising a rotatable output shaft, first and second ratchet means connected to the output shaft each operable to index the output shaft angularly in response to a substantially reciprocatory input thereto along a predetermined line, the first and second ratchet means being arranged relative to the output shaft to index the output shaft in a common direction about the shaft axis, a pair of solenoids each having a reciprocable armature connected to a respective one of the ratchet means so that reciprocatory motion of the armature is effective upon the respective ratchet means along the predetermined line associated therewith, and selectively operable means operatively coupled to each solenoid operable independently of the selectively operable means coupled to the other solenoid for regulating the reciprocation of the armature thereof.

5. Apparatus according to claim 4 wherein the selectively operable means comprises a stop member engageable with the end of each solenoid armature opposite from the coil therefor and mounted for adjustable movement toward and away from the coil.

6. Apparatus according to claim 5 including a spring engaged with each solenoid armature for urging the armature into a predetermined position away from the coil for each armature, each stop member being adjustable to limit reciprocatory movement of its armature away from the coil therefor to a position a selected amount toward the coil from the predetermined position.

7. Apparatus according to claim 4 including means mounting the ratchet means to the output shaft so that each ratchet means is operable to rotate the shaft through complementary portions of each rotation of the shaft.

8. Apparatus according to claim 7 including a cam secured to the output shaft for rotation therewith, the cam defining a control lobe extending through an arc circumferentially of the shaft substantially equal to the arc through which one of the ratchet means is operable to rotate the shaft, means connected to the solenoids for energizing the same, and means engaged with the cam and operable in response thereto for selecting for energization the solenoid coupled to the ratchet means which operates the shaft through the portion of its rotation corresponding to the angular position of the shaft.

9. Apparatus according to claim 8 wherein the means for selecting solenoid energization comprises a switch having a movable contact engaged with the cam and a pair of fixed contacts connected to respective ones of the solenoids, the movable contact being connected to the solenoids and alternately engaging one or the other of the fixed contacts in response to operation thereof by the cam to define a circuit which includes the solenoid connected to the fixed contact with which it is engaged.

10. Apparatus according to claim 9 wherein the means for energizing the solenoids comprises input terminals for the mechanism adapted to be connected to a source of alternating electric current, and a half-wave rectifier connected between an input terminal and the movable switch contact.

11. Apparatus according to claim 9 wherein the switch defines output control terminals of the mechanism coupled to the fixed contacts and the movable contact respectively.

12. Apparatus according to claim 7 wherein the means for energizing the solenoids comprises a pair of input terminals adapted to be connected to a source of alternating electric current, and half-wave rectifier means coupled between the input terminals and the solenoids.

13. An actuator mechanism comprising a rotatable output shaft, first and second ratchet means connected to the output shaft each ratchet means being operable to index the output shaft angularly in response to a reciprocatory input thereto along a predetermined line, at least one of the ratchet means being connected to the output shaft so that it controls rotation of the shaft through a selected portion of each rotation thereof, a pair of connecting links each pivotally connected at one end thereof to a respective ratchet means, synchronously operated means connected to the other ends of the link members operable for reciprocating the link members in such a manner as to provide a reciprocatory input to the respective ratchet means, and selectively operable means operatively engaged with each link member for varying the amount of reciprocation of each link member along the predetermined line associated with the ratchet means to which it is connected independently of the other link member.

14. Apparatus according to claim 13 wherein the synchronously operated means comprises a pair of cranks having a fixed throw and secured to a rotatable input shaft, the other ends of each link member being connected to a respective crank.

15. Apparatus according to claim 14 wherein the selectively operable means comprises a member coupled between each crank and the link member connected thereto and rotatably journalled to the input shaft for directing the throw of the crank along a selected line, and means for indexing said member angularly of the input shaft to vary the angular relation between the selected line and the predetermined line associated with the ratchet means to which the link member is connected.

16. A transmission comprising
(a) a rotatable input shaft,
(b) a rotatable output shaft,
(c) crank means operated by the input shaft,
(d) ratchet means connected to the output shaft and operable to index the output shaft angularly in response to a reciprocatory input thereto,
(e) a connecting link having one end pivotally connected to the ratchet means, and
(f) connecting means for connecting the other end of the connecting link to the crank means including
 (i) means for constraining movement of said other end of the connecting link to reciprocable movement along a straight line, and
 (ii) means selectively operable for varying the orientation of said line angularly relative to a second line oriented longitudinally of the connecting link so that the amount of reciprocation of the connecting link for each rotation of the input shaft is variable.

17. A transmission comprising
(a) a rotatable input shaft,
(b) a rotatable output shaft,
(c) a pair of crank means operated by the input shaft,
(d) a pair of ratchet means connected to the output shaft and operable to index the output shaft angularly in response to a reciprocatory input thereto,
(e) a pair of connecting links each having one end pivotally connected to a corresponding ratchet means, and
(f) connecting means for connecting the other end of each connecting link to a corresponding crank means including
 (i) means for constraining movement of said other end of the associated connecting link to reciprocable movement along a straight line, and
 (ii) means selectively operable for varying the orientation of the line associated with that connecting means angularly relative to a second line oriented longitudinally of the associated connecting link so that the amount of reciprocation of the associated connecting link for each rotation of the input shaft is variable.

18. A transmission comprising
(a) a rotatable input shaft,
(b) a rotatable output shaft,
(c) crank means mounted to the input shaft for movement thereof in response to rotation of the input shaft,
(d) a connecting link,
(e) connecting means for connecting one end of the connecting link to the crank means,
(f) means coupled to the crank means for constraining movement of the connecting means to reciprocal movement along a straight line,
(g) ratchet means interconnecting the other end of the connecting link and the output shaft and operable in response to longitudinal movement of the connecting link to move the output shaft angularly, and
(h) selectively operable means coupled to the crank means for varying the orientation of said line relative to the connecting link for varying the amount the other end of the link moves longitudinally with each reciprocation of the connecting means.

19. A transmission comprising
(a) a rotatable input shaft,
(b) a rotatable output shaft disposed in spaced apart relation to the input shaft,
(c) a pair of crank means mounted to the input shaft for movement thereof in response to rotation of the input shaft,
(d) a pair of connecting links,
(e) connecting means for movably connecting one end of each connecting link to a corresponding crank means,
(f) means coupled to each crank means for constraining movement of the corresponding connecting means to reciprocal movement along a straight line,
(g) a pair of ratchet means interconnecting the other end of each connecting link and the output shaft and operable in response to longitudinal movement of the associated connecting link to move the output shaft angularly, and
(h) selectively operable means coupled to each crank means for varying the orientation of the line of reciprocal movement associated with that crank means relative to the associated connecting link to vary independently of the other connecting link the amount the associated link moves longitudinally with each reciprocation of the connecting means for the associated link.

20. A transmission comprising
(a) a rotatable input shaft,
(b) a rotatable output shaft,
(c) a crank assembly including a wrist pin and connected to the input shaft for operation thereby,
(d) a connector plate connected to the wrist pin and defining an elongate slot therethrough and disposed so that the input shaft passes through the slot,
(e) wrist pin stroke director means connected to the wrist pin for constraining movement of the wrist pin to reciprocal motion along a line radially of the input shaft parallel to the elongate extent of the connector plate slot in response to rotation of the input shaft,
(f) a drive link having one end pivotally connected to the connector plate,
(g) ratchet means connected to the output shaft and responsive to angular motion thereof to index the output shaft angularly,
 (i) the other end of the drive link being connected to the ratchet means at a location spaced radially of the output shaft so that reciprocal motion of the link imparts angular oscillatory motion to the ratchet means, and
(h) selectively operable means connected to the stroke director means for varying the line of wrist pin movement angularly of the input shaft to vary the amount the link reciprocates in response to rotation of the input shaft thereby to vary the amount the output shaft is indexed for each rotation of the input shaft.

21. A transmission comprising
(a) a rotatable input shaft,
(b) a rotatable output shaft,
(c) a crank assembly including a wrist pin and connected to the input shaft for operation thereby,
(d) a connector plate connected to the wrist pin and defining an elongate slot therethrough and disposed so that the input shaft passes through the slot,
(e) wrist pin stroke director means connected to the wrist pin and journalled to the input shaft for constraining movement of the wrist pin to reciprocal motion along a line radially of the input shaft and parallel to the elongate extent of the connector slot in response to rotation of the input shaft, (f) a drive link having one end pivotally connected to the connector plate,
(g) ratchet means connected to the output shaft and responsive to angular motion thereof for indexing the output shaft angularly,
   (i) the other end of the drive link being connected to the ratchet means at a location spaced radially of the output shaft so that reciprocal motion of the link imparts angular oscillatory motion to the ratchet means, and
(h) selectively operable means connected to the stroke director means for indexing the director means angularly of the input shaft to vary the amount the link reciprocates in response to rotation of the input shaft thereby to vary the amount the output shaft is indexed for each rotation of the input shaft.

22. An actuator comprising
(a) an input shaft mounted for rotation about a fixed axis,
(b) an output shaft mounted for rotation about a fixed axis,
(c) a pair of eccentric crank assemblies connected to the input shaft for operation thereby and each including a wrist pin,
(d) a connector plate connected to each wrist pin and defining an elongate slot therethrough through which the input shaft passes,
(e) a wrist pin stroke director means connected to each wrist pin for constraining movement of the wrist pin to reciprocal motion along a line radially of the input shaft and parallel to the elongate extent of the respective connector plate slot in response to rotation of the input shaft,
(f) a pair of drive links each having one end pivotally connected to a corresponding connector plate,
(g) ratchet means connected to the other end of each drive link,
(h) an output cam secured to the output shaft and having a lobe subtending predetermined arc circumferentially of the output shaft and adapted for engagement with a cam follower means,
(i) a pair of ratchet engageable member secured to the output shaft,
   (i) each ratchet engageable member being disposed for cooperation with a corresponding ratchet means for indexing the output shaft angularly in response to reciprocation of the drive link connected to the corresponding ratchet means,
   (ii) each ratchet engageable member subtending a predetermined arc circumferentially of the output shaft,
   (iii) one of the ratchet engageable members subtending an arc equal to the arc subtended by the lobe, and
(j) selectively operable means coupled to each stroke director means for varying the line of reciprocal movement of the associated wrist pin angularly of the input shaft to vary the amount the corresponding link reciprocates in response to rotation of the input shaft.

23. An actuator according to claim 22 wherein the other ratchet engageable means extends circumferentially of the output shaft and is continuously engaged with its corresponding ratchet means.

24. An actuator according to claim 22 wherein the other ratchet engageable member subtends an arc about the output axis substantially equal to 360° less the arc subtended by the one ratchet engageable member.

25. An actuator according to claim 24 wherein the ratchet engageable members are disposed 180° out of phase with one another about the output shaft, the output shaft being indexed angularly in response to operation of each ratchet means when the ratchet engageable member corresponding thereto is engaged therewith.

26. An actuator according to claim 22 wherein each connector plate defines a circular boss, the slot through the connector plate being formed through the boss, and the drive link connected to the connector plate rotatably journals the boss.

27. An actuator comprising
(a) a rotatable input shaft,
(b) an output shaft mounted for rotation about a fixed axis,
(c) a pair of eccentric crank assemblies each including a wrist pin,
   (i) each crank assembly being connected to the input shaft for operation thereby,
(d) a connector plate connected to each wrist pin and defining an elongate slot therethrough,
   (i) each slot being disposed through a raised circular boss in the connector plate,
   (ii) the connector plates being disposed so that the input shaft passes through the slots,
(e) a wrist pin stroke director means connected to each wrist pin for constraining movement of the wrist pins to reciprocal motion along lines radially of the input shaft and parallel to the elongate extent of the respective connector plate slot in response to rotation of the input shaft so that the respective connector plates reciprocate an amount equal to the throw of the wrist pin connected thereto,
(f) a pair of drive links each having one end connected to a corresponding connector plate so as to journal the circular boss thereof,
(g) ratchet means connected to the other end of each drive link,
(h) an output cam secured to the output shaft and having a lobe subtending a predetermined arc circumferentially of the output shaft,
(i) a pair of ratchet engageable members secured to the output shaft,
   (i) each ratchet engageable member being disposed for cooperation with a corresponding ratchet means for indexing the output shaft angularly in response to reciprocation of the drive link connected to the corresponding ratchet means,
   (ii) each ratchet engageable member subtending a predetermined arc circumferentially of the output shaft,
   (iii) one of the ratchet engageable members subtending an arc equal to the arc subtended by the lobe, and
(j) selectively operable means coupled to each stroke director means for varying independently of the other stroke director means the line of movement of the associated wrist pin angularly of the input shaft to vary the amount the corresponding link reciprocates in response to rotation of the input shaft.

28. An actuator according to claim 27 wherein each stroke director means is rotatably mounted to the input shaft and the selectively operable means comprises means for rotating each stroke director means about the input shaft independently of the other stroke director means.

29. An actuator according to claim 27 wherein each stroke director means comprises a plate rotatably mounted to the input shaft and defining a slot therethrough radially of the input shaft in which the corresponding wrist pin is engaged.

30. An actuator according to claim 29 wherein the selectively operable means comprises a gear segment defined by each stroke director plate and a pinion gear meshed therewith.

31. An actuator mechanism comprising a rotatable output shaft, first and second ratchet means connected to the output shaft, each ratchet means being operable to index the output shaft angularly in response to a reciprocatory input thereto along a predetermined line, at least one of the ratchet means being connected to the output shaft so that it controls rotation of the shaft through a selected portion of each rotation thereof, a pair of connecting links each connected at one end thereof to a respective ratchet means, constant throw means connected to the other ends of the link members operable for reciprocating said other ends of the link members, and selectively operable means operatively engaged with each link member for varying, independently of the other link member, the amount of reciprocation of each link member along the predetermined line associated with the ratchet means to which it is connected in response to operation of said constant throw means.

References Cited by the Examiner
UNITED STATES PATENTS

| | | | |
|---|---|---|---|
| 1,181,168 | 5/1916 | Reece | 74—117 |
| 1,242,106 | 10/1917 | Adams | 74—117 |
| 2,135,204 | 11/1938 | Staley et al | 310—24 X |

FOREIGN PATENTS 147,261  7/1920  Great Britain.

MILTON KAUFMAN, *Primary Examiner.*

FRED C. MATTERN, *Examiner.*

D. H. THIEL, *Assistant Examiner.*

UNITED STATES PATENT OFFICE
CERTIFICATE OF CORRECTION

Patent No. 3,310,989                                            March 28, 1967

James E. Ward

It is hereby certified that error appears in the above numbered patent requiring correction and that the said Letters Patent should read as corrected below.

Column 2, line 52, for "results" read -- result --; column 3, line 64, for "structure" read -- structural --; column 8, line 31, for "can" read -- cam --; line 41, for "outer" read -- output --; column 9, line 26, for "show" read -- shown --; column 11, line 18, for "shaft" read -- shaft, --; line 40, for "reciprocably" read -- reciprocatory --; column 14, line 74, after "connector" insert -- plate --; column 15, line 40, for "subtending" read -- subtending a --; line 43, for "member" rea -- members --.

Signed and sealed this 7th day of November 1967.

(SEAL)
Attest:

Edward M. Fletcher, Jr.                                     EDWARD J. BRENNER

Attesting Officer                                                 Commissioner of Patents